US008493174B2

(12) United States Patent
Agrawal

(10) Patent No.: US 8,493,174 B2
(45) Date of Patent: Jul. 23, 2013

(54) APPARATUS FOR INSTANTANEOUS TRANSLATION OF SIGN LANGUAGE

(76) Inventor: Dharma P. Agrawal, Cincinnati, OH (US)

(*) Notice: Subject to any disclaimer, the term of this patent is extended or adjusted under 35 U.S.C. 154(b) by 441 days.

(21) Appl. No.: 12/831,230

(22) Filed: Jul. 6, 2010

(65) Prior Publication Data

US 2011/0234384 A1 Sep. 29, 2011

Related U.S. Application Data

(60) Provisional application No. 61/340,895, filed on Mar. 24, 2010.

(51) Int. Cl.
*G09B 21/00* (2006.01)
*H04Q 5/22* (2006.01)
*G10L 21/06* (2013.01)
*G10L 21/00* (2013.01)

(52) U.S. Cl.
USPC ............ 340/4.1; 340/10.5; 704/271; 704/277

(58) Field of Classification Search
USPC .................................. 340/4.1; 704/271, 277
See application file for complete search history.

(56) References Cited

U.S. PATENT DOCUMENTS

| 5,734,923 | A | 3/1998 | Sagawa et al. |
| 5,990,878 | A | 11/1999 | Ikeda et al. |
| 6,515,669 | B1* | 2/2003 | Mohri ............................ 345/474 |
| 7,205,979 | B2* | 4/2007 | Zimmerman et al. ........ 345/158 |
| 7,565,295 | B1 | 7/2009 | Hernandez-Rebollar |
| 8,279,091 | B1* | 10/2012 | Tran et al. ....................... 341/20 |
| 2002/0080031 | A1* | 6/2002 | Mann et al. ................. 340/572.1 |
| 2005/0243060 | A1* | 11/2005 | Shono et al. ................... 345/158 |
| 2007/0250286 | A1* | 10/2007 | Duncan et al. ................. 702/139 |
| 2008/0163130 | A1 | 7/2008 | Westerman |
| 2008/0252445 | A1* | 10/2008 | Kolen ....................... 340/539.16 |
| 2010/0023314 | A1 | 1/2010 | Hernandez-Rebollar |
| 2010/0063794 | A1 | 3/2010 | Hernandez-Rebollar |
| 2010/0090949 | A1* | 4/2010 | Tianqiao et al. .............. 345/158 |

FOREIGN PATENT DOCUMENTS

JP 2006098424 * 4/2006

OTHER PUBLICATIONS

J. L. Hernandez-Rebollar, N. Kyriakopoulos, and R. W. Lindeman, "A New Instrumented Approach for Translating American Sign Language into Sound and Text," Proc. 6th IEEE International Conference on Automatic Face and Gesture Recognition, 2004.

(Continued)

*Primary Examiner* — Daniel Wu
*Assistant Examiner* — Emily C Terrell
(74) *Attorney, Agent, or Firm* — Scientific Works LLC; Yue Ma

(57) ABSTRACT

An apparatus for instantaneously translating sign language in to voice and video is introduced. The present invention uses accelerometer sensors to compute the position and movement of each finger, thereby instantaneously determining the posture of the hand. The location of fingers with respect to body is accurately determined by placing RFID tags at different parts of the body while a single RFID reader is placed on the index finger. Data from accelerometer sensors and RFID reader are multiplexed and sent wirelessly via a controller to a laptop processor where ultimate conversion of sign language to text/voice is achieved. Further, various characteristics of sign language comprising hand position, hand posture, hand orientation and hand movement are detected based on the accelerometer data and RFID data.

14 Claims, 15 Drawing Sheets

OTHER PUBLICATIONS

R-H. Liang and M. Ouhyoung, "A Real-time Continuous Gesture System for Sign Language," IEEE International Conference on Automatic Face and Gesture Recognition, Japan 1998, pp. 558-567.

Ryan Patterson, "A Glove That Speaks Volumes," At website http://www.wired.com/gadgets/miscellaneous/news/2002/01/49716.

* cited by examiner (a) Fingers open  (b) Fingers open and far apart  (c) Fingers fully closed (d) Fingers half open half closed  (e) Index finger open  (f) Thumb open

| | | | | | | | |
|---|---|---|---|---|---|---|---|
|  | 1. In front of the body |  | 7. Nose |  | 13. Neck |  | 19. Under the arm |
|  | 2. Above the head |  | 8. Mouth |  | 14. Shoulder |  | 20 Arm |
|  | 3. In front of the face |  | 9. Jaw |  | 15. Heart |  | 21. The back of the hand |
|  | 4. Top of head |  | 10 Temple |  | 16. Breast |  | 22. Wrist |
|  | 5. Brow |  | 11. Ear |  | 17. Waist | | |
|  | 6. Eye |  | 12. Cheek |  | 18. Leg | | |

APPARATUS FOR INSTANTANEOUS TRANSLATION OF SIGN LANGUAGE

CROSS-REFERENCE TO RELATED APPLICATIONS

This application claims the benefit of U.S. Provisional Application Ser. No. 61/340,895, filed on Mar. 24, 2010. The disclosure of the above application is incorporated herein by reference in its entirety for any purpose.

FIELD OF THE INVENTION

The present invention generally relates to translation of sign language, and particularly relates to system and process for translating sign language to voice or text using multiple accelerometer sensors and RFIDs.

BACKGROUND OF THE INVENTION

Interpreting sign language signals to text and backward conversion is very useful for communicating with deaf and handicapped people and available technology ought to be used in exploring any such help that can be extended. Many attempts have been made in automating such conversion process in both directions, with minimum physical intervention.

Early attempts were concentrated on using a camera and image processing techniques in classifying different patterns for different postures in a sign language. The majority of these attempts use image and pattern matching techniques to compare captured sign language gestures with pre-stored database such as image patterns or Eigen space of images in order to convert sign language postures into text words. The drawback of these technologies is the intensive computation that is associated with any image processing techniques; therefore, most of these tasks can only be done off-line.

Other attempts have been made to use sensors that are usually attached to the fingers in order to track the gesture path or motion of fingers, or forearm rotation of hands. While these technologies require less computing power, they have the drawback of limited sign language postures that can be recognized due to limitations of sensors. For instance, only locations of fingers can be detected, which limits the conversion of hand posture to English alpha-numeric character; whereas there is a need to detect both the movement of hand itself and location of the hand in order to recognize gestures used extensively in sign language.

It is therefore an objective of the present invention to provide a system and method for detecting hand movement for the translation of sign language.

It is further an objective of the present invention to provide a system and method for detecting hand shape or posture for the translation of sign language.

It is another objective of the present invention to provide a system and method for detecting hand position for the translation of sign language.

It is further an objective of the present invention to provide a system and method for detecting hand or palm orientation for the translation of sign language.

It is still further an objective of the present invention to provide a system and method for converting sign language instantaneously to voice or text without requiring intensive computing power.

It is yet another objective of the present invention to further provide a system and method for using multiple sensors for the purpose of translating sign language.

It is another objective of the present invention to provide a system and method for converting a sign language in both English and non-English.

It is further an objective of the present invention to provide a system and method for converting text or voice to sign language display.

SUMMARY OF THE INVENTION

According to the present invention, a system for converting sign language postures to text comprises of multiple accelerometers and a RFID reader attached to the hand making the sign language gestures, multiple RFID sensors (e.g., strips) attached to different parts of the body, a multiplexer for combining measurements from accelerometers and the RFID reader into a data stream to be sent to a controller, wherein the controller transmits the sensor data to a computer for conversion. The conversion module analyzes sensor data from multiple accelerometers and the RFID reader to be able to detect various characteristics of the sign language such as hand movement, hand shape or posture, hand position and hand or palm orientation relative to the body. The conversion module therefore translates each sign language gesture into text based on detected characteristics of sign language.

According to one feature of the present invention, one 3-D accelerometer is attached to the tip of one finger, and one or more 2-D accelerometers are attached to other fingers. According to one aspect of the present invention, one 3-D accelerometer is attached to the middle finger while four 2-D accelerometers attached to other four fingers of the same hand. While the hand is moving, the RFID reader senses signal from one of plurality of RFID transponders attached to different parts of the body, depending on the relative proximity of the hand as signals from other RFIDs will be too weak to be detected. Therefore, the location of the hand touching different parts of the body can be determined. If the hand is in between two RFIDs, then the current location of hand can be determined by taking the past detected location by an RFID as a reference point and interpolating that using reading from accelerometers. According to another feature of the present invention, five RFID strips are attached to various parts of the body such as forehead, between nose and mouse, neck, upper and lower part of torso. Yet according to another feature of the present invention, accelerometers and RFID reader are attached only to the dominant hand without affecting the performance of translation.

According to another feature of the present invention, an inexpensive microcontroller can be used for the controller to transmit sensor data to a computing unit. In one aspect of the invention, the computing unit is at a remote location whereas the controller is equipped with a wireless interface for transmitting sensor data wirelessly. In another aspect of the invention, the computing unit is attached to the human body, thus the controller transmit sensor data to the computing unit via a wire.

According to another feature of the present invention, a multiplexer is used to combine sensor data efficiently in one data packet to be sent to the controller. Twenty four bits are used for each 3-dimensional accelerometer, and eight bits are used for the RFID reader output and repeated three times for error correction. For 2-D accelerometers, the eight bits corresponding to the third dimension could be set to zero.

The present invention is advantageous over previous sign language translation systems such that the present invention overcomes the shortcoming of many image processing or camera based techniques, which require intensive computing power. By using multiple sensors, such as accelerometers and RFID, whose data can be transmitted to a computing unit with minimal delay, an instantaneous translation of sign language to text or voice can be realized.

Further, the advantage of the present invention includes the use of multiple sensors to be attached to different parts of a body in a special arrangement. The result is accurate detection of extended hand postures, such as hand position, hand movement, hand shape or posture and hand or palm orientation, which are often used expressively in a sign language.

Further, the advantage of the present invention includes the use of inexpensive sensors, the optimization of data structures for faster transmission and processing, the capturing of data from the dominant hand, thus fewer requirements on computational power, which allows the present invention to be built in a relatively inexpensive way.

For a more thorough understanding of the invention, its objectives and advantages refer to the following specification and to the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Sign language is typically characterized by use of different number of fingers, position of fingers, movement of fingers and hand and pointing fingers to different parts of the body. Therefore, it is not only important to know the posture of fingers of the dominant hand, but its location and relative movement with respect to head, face, or neck is also required.

I. Automated Scheme Using Accelerometer Sensors and RFIDs

In reference to FIG. 4(a), according to the present invention, accelerometer sensors are attached to the tip of each finger of dominant hand. The sensor data will be able to help determine instantaneously the position of each finger and motion of each finger in three coordinate axes, whether a finger is open, partially closed or fully closed. There are many accelerometer sensors commercially available in the open market and any 3-axes unit can be adopted, with a typical cost around $20-$40 in retail. A multiplexer is used to send accelerometer data from the tip of each finger to a controller, as shown in FIG. 4(a), which can be placed at the back of the palm or the wrist or the elbow.

According to another feature of the present invention, to determine current location of the fingers with respect to body (face, nose, cheek, and heart or belly button), inexpensive RFID transponders are used to attach to various parts of a body, and a RFID reader is attached to the index finger in order to detect the position of the hand with respect to the body. For example, in reference to FIG. 4(b), one RFID transponder is attached to the head; one is attached to between nose and mouth; one is attached to the neck; one attached to the upper chest and one attached to the lower chest in the torso area. The RFID transponder can be RFID strips, which are commercially available (FIG. 4(b)), with each strip costing few pennies. For example, Wal-Mart is using an inexpensive RFID tag as described in Wikipedia.

One RFID reader can be attached to any finger, such as index finger, or back or front of the palm. While the hand is moving, the RFID reader senses signal from one RFID transponder depending on the relative proximity of the hand as signals from other RFIDs will be too weak to be detected. Therefore, the location of the hand touching different parts of the body can be determined. If the hand is in between two RFIDs, then the current location of hand can be determined by taking the past detected location by an RFID as a reference and interpolating that using reading from accelerometers. The data from RFID can be multiplexed with the acceleration data from finger tips and sent to a controller. RFID reader is commercial available. For example, a RFID pen reader cost around $28-$76 in retail.

II. Data Structure and Transmission

Figure 5:
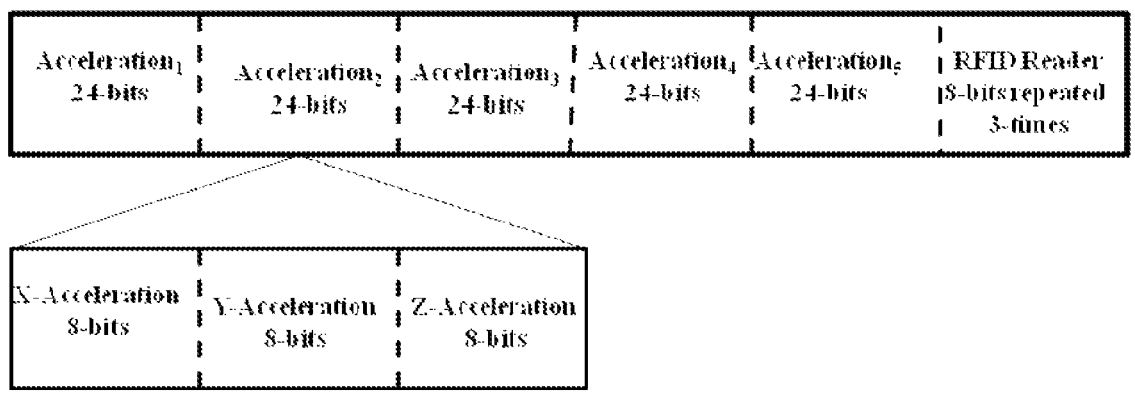
FIG. 5 is an exemplary format of data package according to the according to the present invention.

According to one feature of the present invention, in reference to FIG. 5, the data from accelerometers and RFID reader are grouped per time frame in a packet. The packet format is five 24-bit segments, each 24-bit representing data from each accelerometer (on each finger), followed by 24-bit data from the RFID reader. Most commercially available accelerometers provide output up to 128 bits from their A/D converter. But, many of these bits can be suppressed by appropriately connecting them to earth and only 8-bits per axis are adequate to indicate acceleration in a given direction.

Similarly, RFID tends to provide a large number of ID bits (up to 128 bits) and for our application, only 8-bits are enough and can be replicated to provide redundancy and ensure accuracy of the results. The RFID reading output can be repeated three times, with total of 24-bits. A majority voting rule can be used to compare these three replicates and determine accurate RFID reading. In another aspect of the invention, error correcting codes can be inserted into the RFID reading output to make up the longer bit string. In yet another aspect of the invention, error correcting codes, check-sum bits can be combined in the data packets.

The multiplexer can send packets from five accelerometers and the RFID reader one by one in a pre-specified sequence similar to a Time-Division-Multiple-Access (TDMA) mode and can be done in accordance with the speed of the microprocessor in the controller. The cost of 16-bit 18-MHz RISC microcontroller can be less than 50 cents. The data from the controller unit is transmitted using wireless radio (such as WiFi, Bluetooth, Zigbee, etc.) to a computer, such as a laptop or embedded device, which is acting as a main processor. A wireless radio costs around $25.

Figure 10:
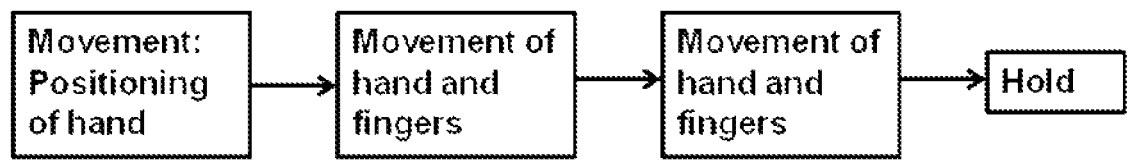
FIG. 10 is an exemplary movement-hold model according to the present invention.

The 144-bits of data from using five accelerometers and one RFID reader (8×3×6=144 bits as illustrated in FIG. 5) can be sent to 1-MHz controller in 144 μsec. It is rather hard to define the end of one sign language action commonly known as phoneme as the size varies from alphabets and words. It is interesting to note the absence of any article in a Sign language. A detailed experimentation has been done and described in Charly Awad, Nicolas Courty, Kyle Duarte, Thibaut Le Naour, and Sylvie Gibet, "A Combined Semantic and Motion Capture Database for Real-Time Sign Language Synthesis," Intelligent Virtual Agents: Lecture Notes in Computer Science, Springer-Verlag Berlin Heidelberg, Zs. Ruttkay et al. (Eds.): IVA 2009, LNAI 5773, pp. 432-438, 2009, to determine the structure of Sign language sequence transitions using weather forecast and city names and mean length is found to be about 24.5 seconds (storage of 735 frames with a rate of 30 frames per second) with standard deviation of 7.46 seconds (224 frames). Such a large variation in Sign structure has forced some existing scheme to use a switch button, for example, in R-H. Liang and M. Ouhyoung, "A Real-time Continuous Gesture System for Sign Language," IEEE International Conference on Automatic Face and Gesture Recognition, Japan 1998, pp. 558-567, to indicate end of the current phoneme and start of the next. Such inclusion of a switch introduces manual intervention. To characterize the sign language, sign movements have been characterized by three steps of movements (M) followed by a hold (H), as described in Christian Philipp Vogler, "American Sign Language Recognition: Reducing the Complexity of the Task with Phoneme-based Modeling and Parallel Hidden Markov Models," PhD Dissertation in Computer and Information Science, University of Pennsylvania, 2003, and is identified as a M-M-M-H model. This has been illustrated in FIG. 10. In an alternate view, the frame could have only two steps of movement and hold. This makes an average movement/hold step to last around 5 to 10 seconds. Such movement and hold periods can be automatically detected and determined by the accelerometer sensors. The number of samples from accelerometers and RFID reader can be limited to one reading every 10 milliseconds, giving us about 500 to 1000 samples per M or H period. Thus, the controller accumulates data from accelerometers and RFIDs and could do partial processing to identify the delimiters of Sign phonemes and can transfer data corresponding to several seconds of Sign language to the laptop computer in the order of milliseconds as it depends on the wireless radio channel bandwidth. The complete conversion process could take in the order of 50-100 milliseconds and such a small delay makes this scheme very attractive and cost-effective.

III. Automatic Conversion

Figure 6:
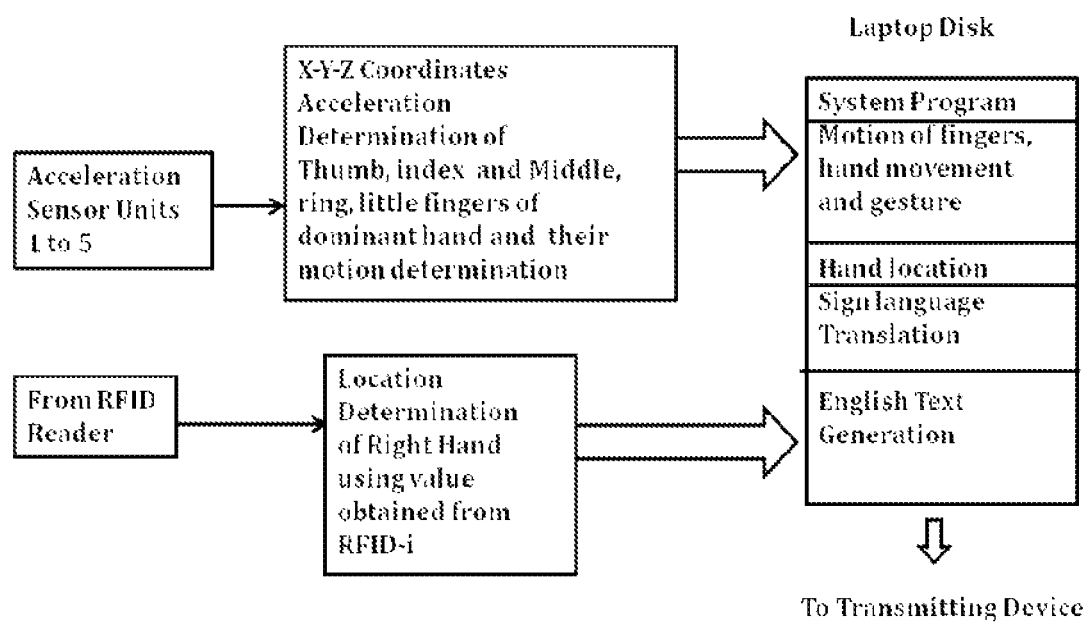
FIG. 6 is an exemplary functional diagram of sign language to text conversion according to the present invention.

In reference to FIG. 6, according to one feature of the present invention, the steps required to automatically convert sign language movements to text in a laptop processor are described. These will be further explained by way of examples with reference to FIGS. 11-14.

We assume that the dictionary of conversion from different types of sign movements to text and voice has already been created and stored in the disk. The conversion from sign language to voice can be done in a similar way, in which the English text translation will be fed through a voice generation system such as text-to-speech (TTS). Such voice generation system is widely available.

It may be noted that the conversion steps can be used for left-handed person in a similar way.

IV. Sign Language Characteristics

The sign language can be characterized by hand position, hand shape or posture, hand or palm orientation, and hand movement. Some of characteristics may be common among sign languages in different countries, whereas some characteristics may be more typical of a specific language. Some characteristics may be used for representing alphabets while some may be used for expressing expressions or emotions. Therefore, the capability of detecting these characteristics in the present invention makes the invention adaptable to more accurate translation and to multiple sign languages.

By way of examples, representatives of sign language characteristics are explained in detail.

(1) Hand Position

Commonly, eleven locations have been identified as starting and ending positions for the signs in the lexicon composed by one-handed signs: heads, cheek, chin, right shoulder, chest, left shoulder, stomach, elbow, far head, far chest and far stomach as described in J. L. Hernandez-Rebollar, N. Kyriakopoulos, and R. W. Lindeman, "A New Instrumented Approach for Translating American Sign Language into Sound and Text," Proc. 6th IEEE International Conference on Automatic Face and Gesture Recognition, 2004. As less than 5% of spots are located below stomach, as described in SLIPA: An IPA for Signed Languages by David Peterson at David Peterson's Web Thing (a website), nine different hand locations in the head regions are shown in Table 1, while seven such dominant locations in the body area in torso region is summarized in Table 2. Based on these two tables, some exemplary locations of the hand or index finger on different parts of the body are illustrated in FIG. 4(b). To be able to detect different hand locations relative to the body, multiple RFID transponders (e.g. RFID strips) are attached to different parts of the body, and one RFID reader is attached to the hand. Based on the reading of RFID reader, the location of hand can be detected. If the location of hand is between two RFID transponders, the actual location can be interpolated using past known location and velocity of hand that is determined by accelerometer.

TABLE 1

Hand in the Head Region

| Spot Location | Location |
|---|---|
| 1 | Top of Forehead |
| 2 | Middle of Forehead |
| 3 | Right in between eyes |
| 4 | Nose in between brow and tip |
| 5 | Tip of nose |
| 6 | Upper lip |
| 7 | Lower lip |

TABLE 1-continued

Hand in the Head Region

| Spot Location | Location |
|---|---|
| 8 | Dimple between lower lip and chin |
| 9 | Chin |

TABLE 2

Hand in the Torso Region

| Spot Location | Region |
|---|---|
| A | Throat |
| B | Center of collar bone |
| C | Middle of the chest |
| D | Bottom of the chest |
| E | Solar plexus |
| F | Belly button |
| G | Bellow the belly button |

(2) Hand Shape or Posture

Figure 1:
FIG. 1 is an exemplary illustration of positions of fingers as part of sign language characteristics according to one aspect of the present invention.
Figure 1:
Figure 1:
Figure 1:
Figure 1:
Figure 1:

In general, six different orientations of index finger are: up, down, right, left, ahead, and back and there are approximately 150 different hand shapes, with 41 phonemically distinct hand shapes, as described in E. Costello, editor, Random House Webster's Unabridged American Sign Language, Random House, 2001 and R. A. Tennant and M. G. Brown, The American Sign Language Hand shape Dictionary, Gallaudet University Press, 1998. In reference to FIG. 1, exemplary hand shape and postures for American Sign Language, as used by John Goldsmith, "American Sign Language" presentation, Winter 2005, are reproduced and illustrated.

(3) Hand or Palm Orientation

Figure 2:
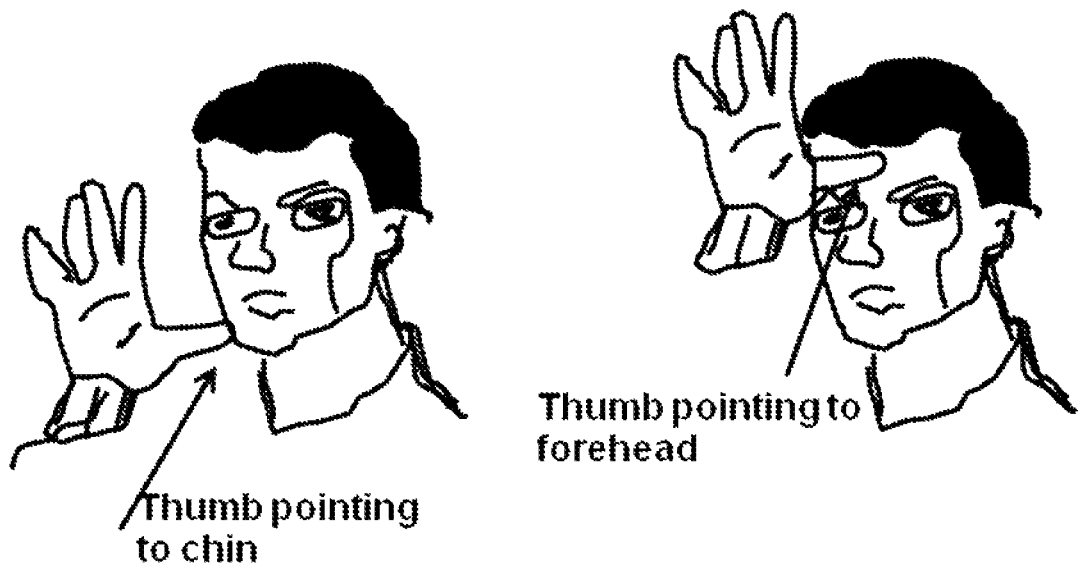
FIG. 2 shows example locations of the finger in a sign language.

In reference to FIG. 2, exemplary locations of hand for American Sign Language, as used by John Goldsmith, "American Sign Language" presentation, Winter 2005, are reproduced and illustrated.

(4) Hand Movement

Figure 3:
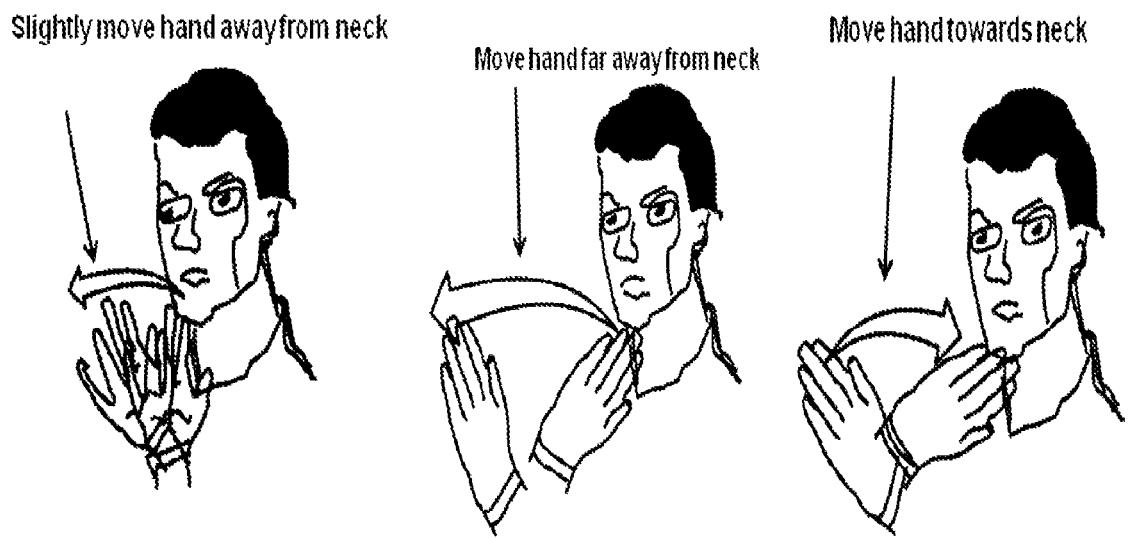
FIG. 3 is an exemplary illustration of hand movements as part of sign language characteristics according to one aspect of the present invention.

In reference to FIG. 3, exemplary hand movements for American Sign Language, as used by John Goldsmith, "American Sign Language" presentation, winter 2005, are reproduced and illustrated. Movement of a hand is described by two primitives: shape (curviness) and direction. These primitives are also universal to other languages. For example, in reference to FIG. 8, eight movements in Taiwanese Sign Language, as used in R-H. Liang and M. Ouhyoung, "A Real-time Continuous Gesture System for Sign Language," IEEE International Conference on Automatic Face and Gesture Recognition, Japan 1998, pp. 558-567, are reproduced and illustrated. The movement and position of hands and fingers are done with reference to fixed reference point such as the shoulder, as described in U.S. Pat. No. 7,565,295 to Jose L. Hernandez-Rebollar.

Figure 9:
FIG. 9 is an illustration of twenty two gesture/body relative positions of Taiwanese Sign Language as an example of characteristics of sign language according to the present invention.
Figure 9:
Figure 9:
Figure 9:
Figure 9:
Figure 9:
Figure 9:
Figure 9:
Figure 9:
Figure 9:
Figure 9:
Figure 9:
Figure 9:
Figure 9:
Figure 9:
Figure 9:
Figure 9:
Figure 9:
Figure 9:
Figure 9:
Figure 9:
Figure 9:

According to one aspect of the present invention, the hand can be moved either in the four directions of North, South, East, and West. The linear movements are arcs in the wide area, medium sized or a narrow, circle type, helicopter and the movement types are wiggling, zigzagging, diacritic, drunken, jerky, tumbling, quick, and slow, bouncing. In reference to FIG. 9, twenty-two exemplary basic gesture/body relative positions in Taiwanese Sign Language, as used in R-H. Liang and M. Ouhyoung, "A Real-time Continuous Gesture System for Sign Language," IEEE International Conference on Automatic Face and Gesture Recognition, Japan 1998, pp. 558-567, are reproduced and illustrated.

The fingers can be moved in many different ways. The wrist can be unbent, palm facing away from body, palm facing towards body, thumb edge of hand is facing towards body, fingertips are facing away from the body, fingertips are facing towards the body, wrist bent further, wrist bent backwards.

Besides movement of fingers, part of the body could be either touched, faced, rubbed, or brushed, with thumb, index finger, middle finger, ring finger or pinky finger, with palm or keeping hand in the side or back. These are described in SLIPA: An IPA for Signed Languages by David Peterson at David Peterson's Web Thing (website). The RFID will indicate presence of the hand in a given area independent of whether a given spot is being touched or rubbed. But, the accelerometers on fingers can detect whether the finger is being touched, faced, rubbed or brushed.

V. Dominant Hand

The sign language narrator is either right hander or left hander and is called a dominant hand and the non-dominant hand either mirrors the dominant hand exactly, or in the opposite way. The mirror can be exact mirror or an inverse mirror in the horizontal, vertical, or outward direction, as described in SLIPA: An IPA for Signed Languages by David Peterson at David Peterson's Web Thing (website).

Figure 4:
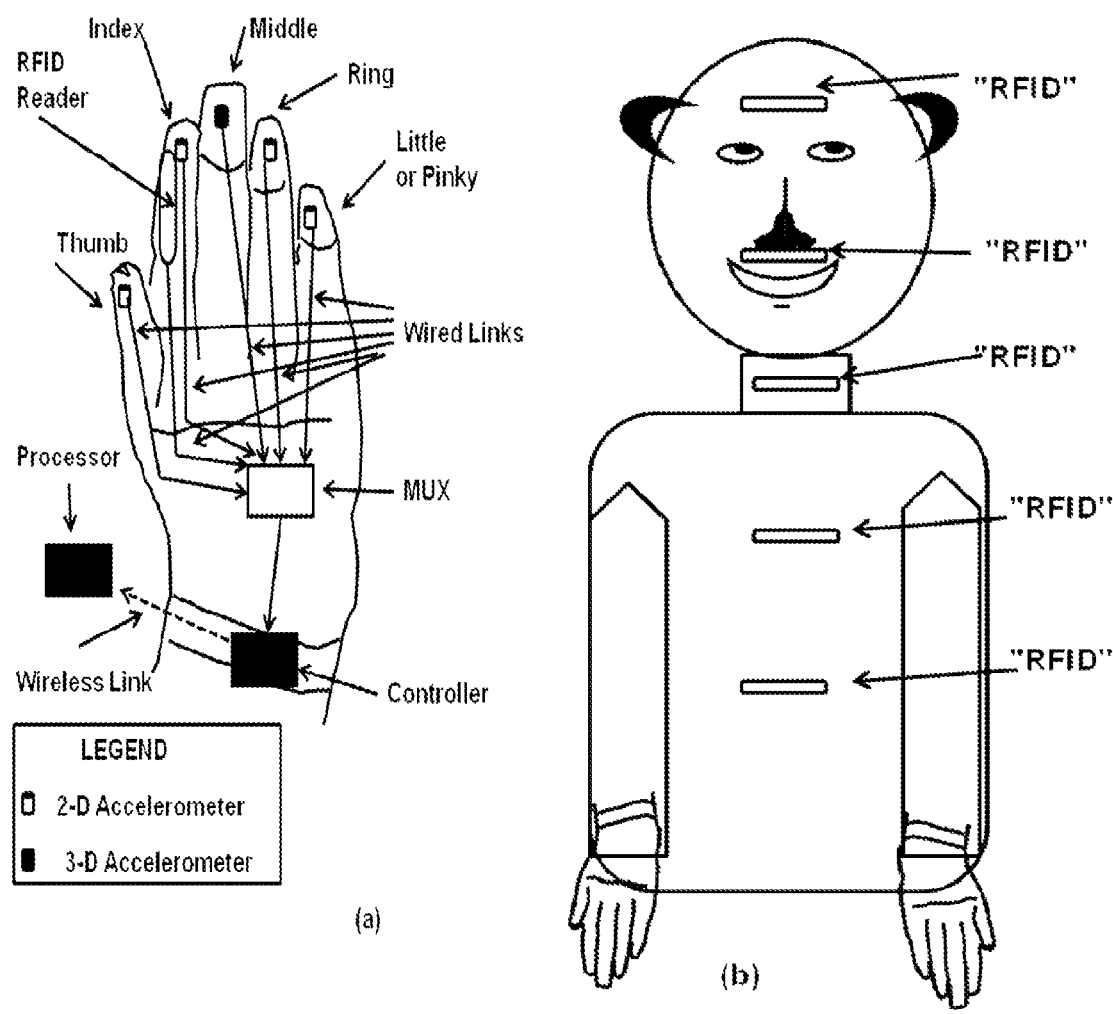
FIG. 4 is an exemplary placement of sensors on the body of sign language narrator according to one aspect of the present invention.

For example, the location of body touched is given in FIG. 4 for face, neck to stomach. There are two spots in the body which are exact mirror of each other for the opposite side of the arm. So, it is adequate to consider only one half of FIG. 4. For simplicity, we can only consider right half of human face. Also, touching the legs and feet is rather rare in a sign language; they can be ignored; even though they can be easily incorporated by placing RFID tags on them. It may be noted that they could be easily included by having another set of accelerometers and RFID reader and sending the collected information to the same laptop using another wireless radio.

A method for translating movement occurring between initial and final pose of sign is called as a phoneme, and require matching with hand posture, as described in U.S. Pat. No. 7,565,295 to Jose L. Hernandez-Rebollar. Multiple possible matches may be desirable and several iterations may be needed to accurately select among the candidate sign corresponding to the match, as described in U.S. Pat. No. 7,565, 295 to Jose L. Hernandez-Rebollar.

VII. An Example

Figure 8:
FIG. 8 is an illustration of eight movements of Taiwanese Sign Language as an example of characteristics of sign language according to the present invention.
Figure 11:
FIG. 11 is an exemplary sign language gesture according to the present invention.
Figure 12:
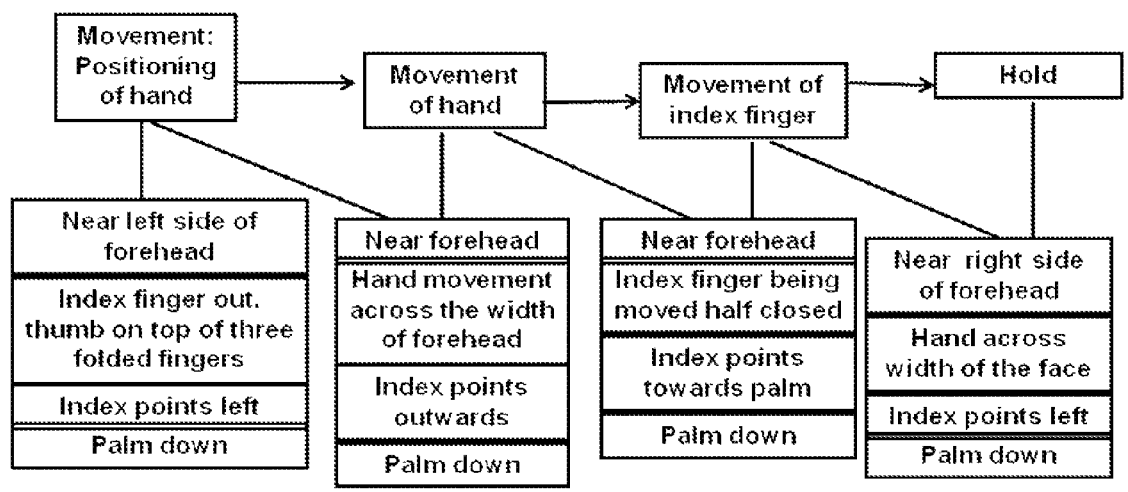
FIG. 12 is the movement-hold model for the sign language gesture shown in FIG. 11 according to the present invention.

In reference to FIG. 11, a motion for the term: SUMMER, as described in "Signing Savvy—Your Sign Language Resource" (a website), is shown. The M-M-M-H model is illustrated in FIG. 12, with specific movement identified in each step and the last hold step shows end of motion. The position of different fingers can be indicated by the signals obtained from accelerometer. The location of the fingers near the forehead will be indicated by the RFID reader. Movement of fingers and hand will be indicated by the accelerometers. The data obtained from accelerometers need to be mapped in to different movements as indicated in FIG. 8 and a table look up can be created to translate movement of fingers and hand to different shapes of FIG. 8.

Figure 13:
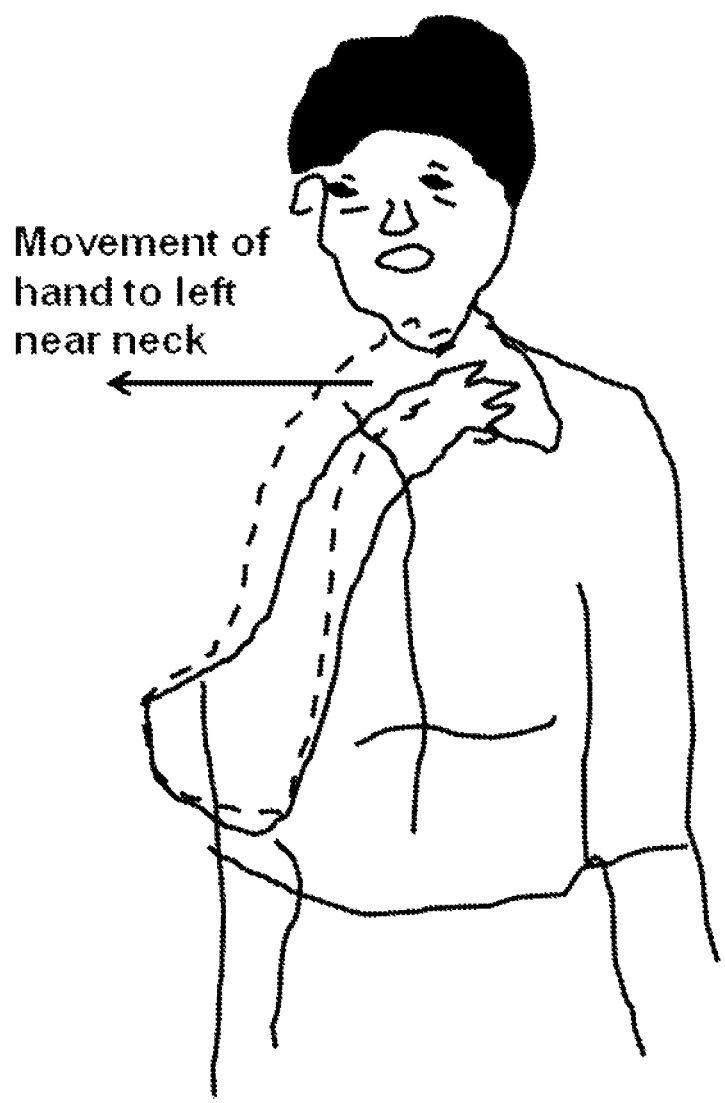
FIG. 13 is an exemplary sign language gesture according to the present invention.
Figure 14:
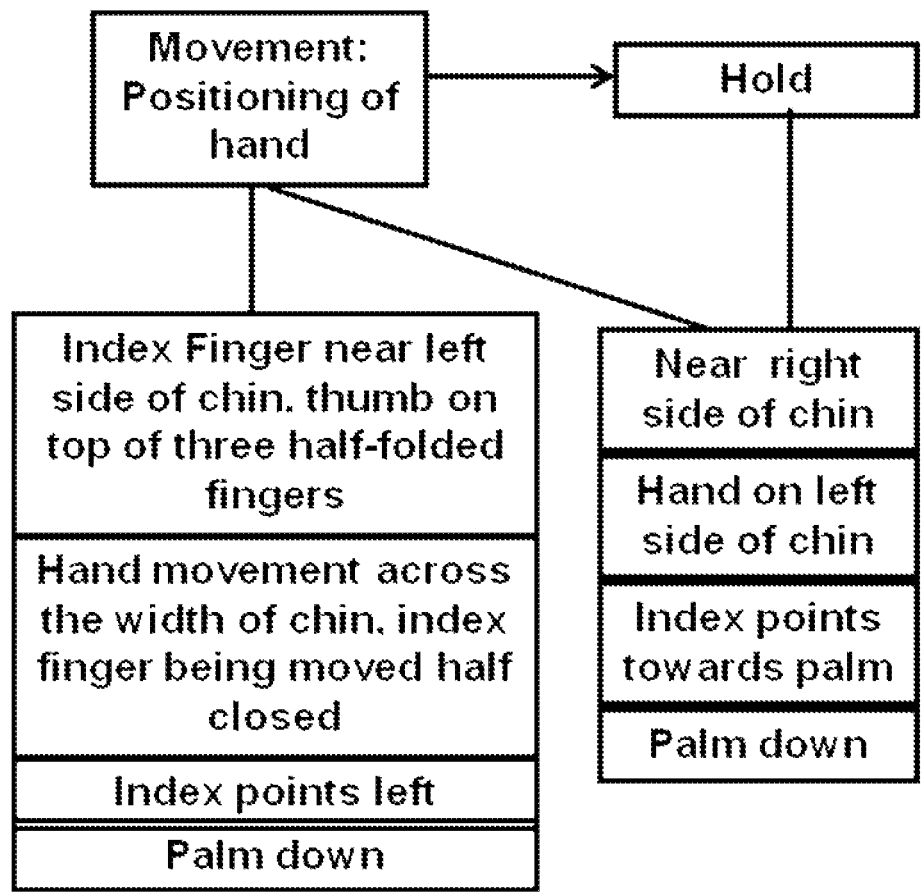
FIG. 14 is the movement-hold model for the sign gesture shown in FIG. 13 according to the present invention.

Another example for the word "DRY", as described in "Signing Savvy—Your Sign Language Resource" (a website), is shown in FIG. 13. Its corresponding M-H model is shown in FIG. 14.

Figure 15:
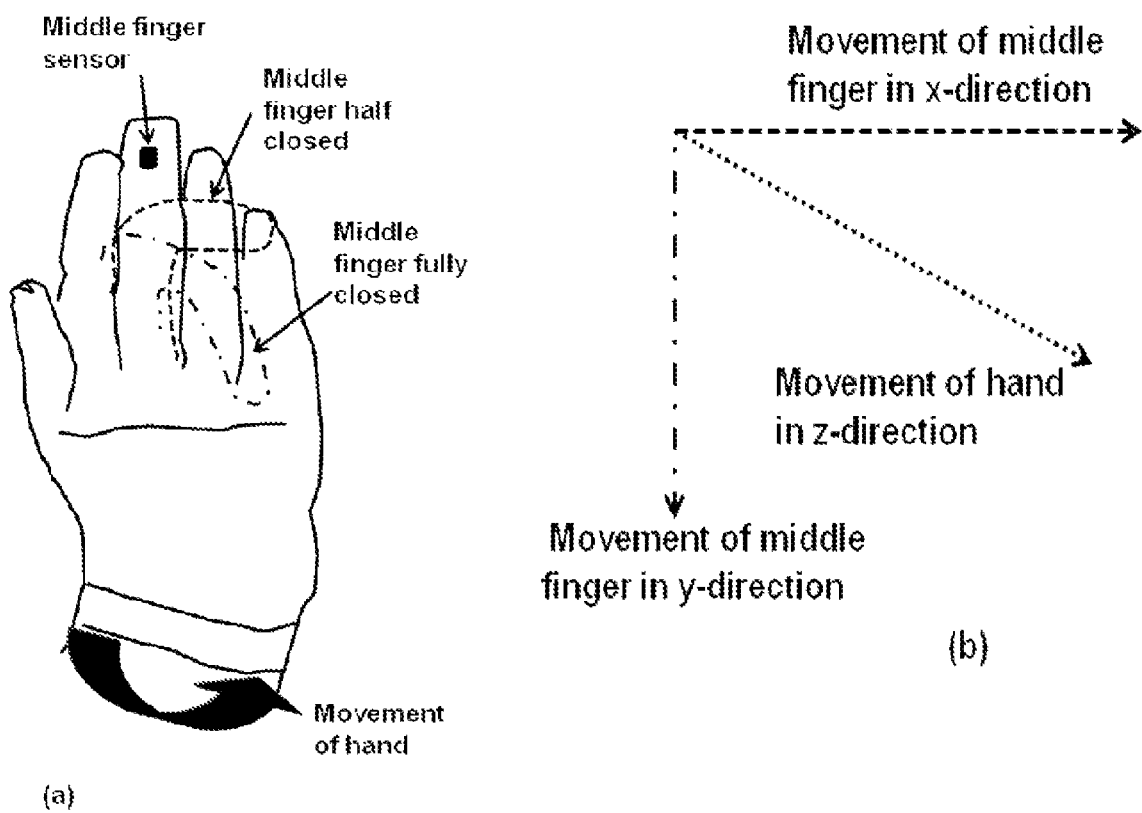
FIG. 15 illustrates the detection of finger and hand movement based on the reading of 3D accelerometer according to the present invention.

In reference to FIG. 15, exemplary gestures and corresponding readings of an accelerometer are shown. The 2D accelerometer can determine the position of each finger while the 3D accelerometer can not only detect the position of the finger, but also the movement of the hand. According to one aspect of the present invention, a 3D accelerometer is attached to the middle finger. When the middle finger is at "half closed", the corresponding acceleration in X direction can be read from the accelerometer; whereas the acceleration in Y direction is read when the middle finger is "fully closed". The movement of hand can also be detected via the reading of, the acceleration in Z direction.

Figure 7:
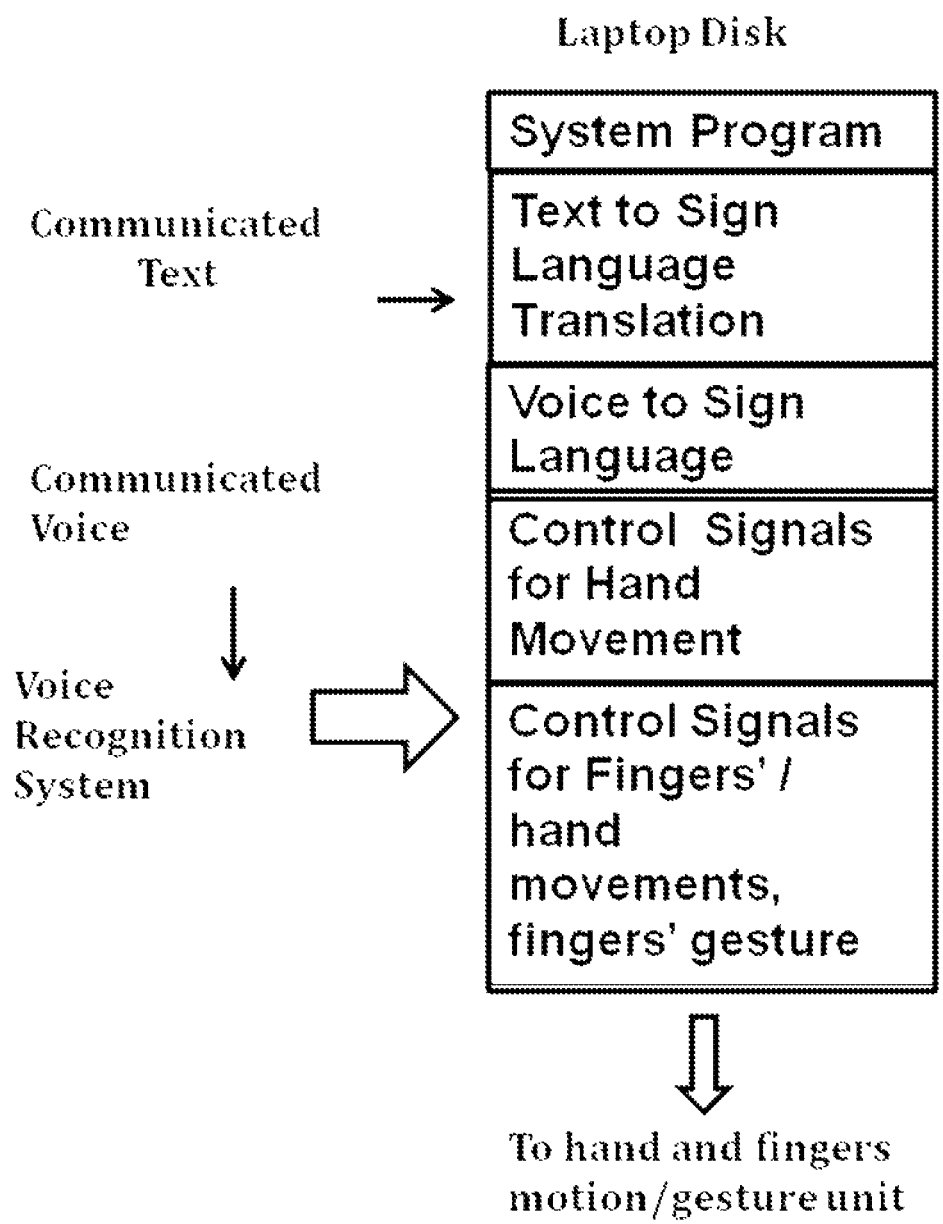
FIG. 7 is an exemplary functional diagram of text/voice to sign language conversion according to the present invention.

FIG. 7 shows steps needed in converting text or voice signals to sign language movements. These could be realized with current technology. Such an apparatus will be very useful and economically feasible for deaf and handicapped people.

The description of the invention is merely exemplary in nature and, thus, variations of the above disclosed embodiments can also be made to accomplish the same functions. For example, whereas data packet reserves 24 bits for each accelerometer with three axes, for two or fewer axes the unused axes can simply be set to zero. Instead of RFID reader being attached to the index finger, as shown in FIG. 4, it can be attached to other fingers or part of the palm, front or back. This will only require slight calibration of the conversion module.

In yet another embodiment according to the present invention, instead of multiplexer and controller being separate units, they can be combined into one single unit having the functions of multiplexing and transmitting. The combined unit would have a microcontroller for execution of machine instructions on the operation of the device, a memory for assembling data packets from sensor data to be ready for transmitting, and a readable memory medium for storing machine instructions. The controller device would also have data I/O interface for communicating with the translation engine.

In yet another embodiment according to the present invention, the controller could also combine the translation engine having a readable memory medium for storing computer instructions for receiving sensor data from the controller internally or externally, detecting characteristics of sign language associated with captured gestures and converting to text or voice. According to one aspect of the invention, the translation engine would have a memory for executing computer instructions and I/O interface for delivering the results to the user with either a display for text output or a speaker for voice output.

In yet another embodiment according to the present invention, the I/O interface of the translation engine could be at a remote location, for example, in a video conferencing or on-line education environment, in which the end user of the translation system is located at a remote location of the network.

In one embodiment of the present invention, a 3D accelerometer is attached to one finger and four 2D accelerometers are attached to other fingers. The 2D accelerometer is used to measure accelerations in X and Y directions thus detect finger movement, whereas 3D accelerometer also records additional acceleration in Z direction thus detect the hand movement relative to the body. In yet another embodiment according to the present invention, a variation of arrangement of 2D and 3D accelerometers can be used, e.g. two 3D accelerometers are attached to index and middle finger; while three 2D accelerometers are attached to other fingers. Still further, in another embodiment according to the present invention, depending on which sign language and application, fewer accelerometers may be used if not all finger movement (e.g. ring finger) is critical in converting the sign language to text.

The embodiments described herein are not limited to any specific language as the detection of sign language characteristics from sensor data can be adapted easily to handle a variety of characteristics pertaining to any particular sign language.

Still further variations, including combinations and/or alternative implementations, of the embodiments described herein can be readily obtained by one skilled in the art without burdensome and/or undue experimentation. Such variations are not to be regarded as a departure from the spirit and scope of the invention.

What is claimed is:

1. A sign language translation system for converting sign language to text, the system comprising:
   a 3-axis accelerometer sensor and four 2-axis accelerometer sensors, wherein the 3-axis accelerometer sensor is disposed at a finger tip of a finger of a hand of a person using the sign language and each of the 2-axis accelerometer sensors is selectively disposed at a finger tip of one of other fingers of the hand;
   RFID transponders selectively disposed in pre-determined regions of an upper body or clothing of the person, said regions located proximate to or along a centerline of an anterior side of the upper body;
   a RFID reader disposed on a finger or a palm of the hand and configured for acquiring first data from the RFID transponders;
   a multiplexer multiplexing second data acquired from the sensors and the first data into a sequence of data packets; and
   a controller transmitting the data packet to a computer converting the data packets to the text;
   whereby the computer is configured to detect in the data packets hand position of the person using the first data as a reference point and interpolating the hand position using the second data.

2. The system of claim 1, wherein the RFID transponders are selectively disposed in the forehead, between a nose and a mouth, neck, upper torso and lower torso regions.

3. The system of claim 1, wherein the computer is configured to detect in the data packets—at least one of hand position, hand shape, hand orientation, and hand movement characteristics of the sign language.

4. The system of claim 3, wherein the computer is configured to detect the hand shape using the second data.

5. The system of claim 3, wherein the computer is configured to detect the hand orientation using the second data.

6. The system of claim 3, wherein the computer is configured to detect the hand movement using data acquired from the 3-axis accelerometer sensor.

7. A method of converting sign language to text, the method comprising:
   providing a 3-axis accelerometer sensor and four 2-axis accelerometer sensors, wherein the 3-axis accelerometer sensor is disposed at a finger tip of a finger of a hand of a person using the sign language and each of the 2-axis accelerometer sensors is selectively disposed at a finger tip of one of other fingers of the hand;
   providing RFID transponders selectively disposed in pre-determined regions of an upper body or clothing of the person, said regions located proximate to or along a centerline of an anterior side of the upper body;

providing a RFID reader disposed on a finger or a palm of the hand and configured for acquiring first data from the RFID transponders;

multiplexing second data acquired from the sensors and the first data into a sequence of data packets;

transmitting the data packets to a computer; and converting the data packets to the text using the computer, wherein the computer is configured to detect in the data packets hand position of the person using the first data as a reference point and interpolating the hand position using the second data.

8. The method of claim 7, further comprising:

disposing the RFID transponders in the forehead, between a nose and a mouth, neck, upper torso and lower torso regions.

9. The method of claim 7, further comprising:

configuring the computer to detect in the data packets at least one of hand position, hand shape, hand orientation, and hand movement characteristics of the sign language.

10. The method of claim 9, further comprising:

configuring the computer to detect the hand shape using the second data.

11. The method of claim 9, further comprising:

configuring the computer to detect the hand orientation using the second data.

12. The method of claim 9, further comprising:

configuring the computer to detect the hand movement using data acquired from the 3-axis accelerometer sensor.

13. An apparatus for converting a sign language to text, comprising:

first means monitoring positions and movements of finger tips of a hand of a person using the sign language, said means including a 3-axis accelerometer sensor and four 2-axis accelerometer sensors, wherein the 3-axis accelerometer sensor is disposed at a finger tip of a finger of the hand and each of the 2-axis accelerometer sensors is selectively disposed at a finger tip of one of other fingers of the hand;

second means monitoring position and movements of the hand, said means including (i) a RFID reader disposed on a finger or a palm of the hand and (ii) RFID transponders selectively disposed in the forehead, between nose and mouth, neck, upper torso and lower torso regions of an upper body of the person or clothing thereon;

third means multiplexing data acquired from the first and second means into a sequence of data packets; and fourth means transmitting the data packets to a computer configured for converting data packets to the text;

whereby the computer is configured to detect in the data packets hand position of the person using the data acquired from the second mean as a reference point and interpolating the hand position using the data acquired from the first mean.

14. The apparatus of claim 13, wherein the second means detects at least one of hand position, hand shape, hand orientation, and hand movement characteristics of the sign language.

* * * * *